United States Patent
Hermes

(10) Patent No.: US 7,314,892 B2
(45) Date of Patent: *Jan. 1, 2008

(54) METHOD FOR PREPARING STORAGE-STABLE FAST-DRYING MULTI-COMPONENT AQUEOUS COATING COMPOSITIONS AND COATINGS DERIVED THEREFROM

(75) Inventor: Ann Robertson Hermes, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 584 days.

This patent is subject to a terminal disclaimer.

(21) Appl. No.: 10/740,009

(22) Filed: Dec. 18, 2003

(65) Prior Publication Data

US 2004/0131788 A1 Jul. 8, 2004

Related U.S. Application Data

(62) Division of application No. 10/095,365, filed on Mar. 11, 2002, now Pat. No. 6,734,226.

(51) Int. Cl.
*F21V 7/22* (2006.01)

(52) U.S. Cl. ............... 523/172; 106/31.04; 427/136; 427/137; 427/385.5

(58) Field of Classification Search ............ 427/385.5, 427/136, 137; 523/172; 106/31.04
See application file for complete search history.

(56) References Cited

U.S. PATENT DOCUMENTS

| | | | |
|---|---|---|---|
| 4,018,826 A | 4/1977 | Gless, Jr. et al. | |
| 4,119,600 A * | 10/1978 | Bakule et al. | 524/13 |
| 4,778,725 A | 10/1988 | Serizawa et al. | |
| 5,217,813 A | 6/1993 | Roser et al. | |
| 5,280,077 A | 1/1994 | Carroll et al. | |
| 5,492,765 A | 2/1996 | Vratsanos et al. | |
| 5,567,750 A | 10/1996 | Schultze et al. | |
| 5,804,627 A | 9/1998 | Landy et al. | |
| 5,861,188 A | 1/1999 | Schall et al. | |
| 5,863,879 A | 1/1999 | Zirnstein et al. | |
| 5,939,514 A | 8/1999 | Brown et al. | |
| 6,239,212 B1 * | 5/2001 | Green | 524/589 |
| 6,734,226 B2 * | 5/2004 | Hermes | 523/172 |

FOREIGN PATENT DOCUMENTS

| | | |
|---|---|---|
| DE | 19917235 A1 | 4/1999 |
| EP | 0409459 A2 | 1/1991 |
| EP | 0409459 | 5/1997 |
| JP | 2000109746 A | 4/2000 |
| WO | WO96/22338 | 7/1996 |

OTHER PUBLICATIONS

D. Barton and W. D. Ollis, *Comprehensive Organic Chemistry*, vol. 2. pp. 34-36,Pergamon Press, New York (1979), p. 36.
Polymin™ (Polyethylenimine) product bulletin from BASF.

* cited by examiner

*Primary Examiner*—Edward J. Cain
(74) *Attorney, Agent, or Firm*—Andrew E. C. Merrium

(57) ABSTRACT

A storage stable, fast drying multi-component aqueous coating composition which includes an anionically stabilized binder polymer, a vinylamine polymer and a volatile base is disclosed. A method for using the aqueous coating composition to produce a coating on the surface of a substrate is further disclosed, along with the coating produced.

3 Claims, No Drawings

METHOD FOR PREPARING STORAGE-STABLE FAST-DRYING MULTI-COMPONENT AQUEOUS COATING COMPOSITIONS AND COATINGS DERIVED THEREFROM

This application is a divisional of prior U.S. application Ser. No. 10/095,365, filed Mar. 11, 2002 now U.S. Pat. No. 6,734,226.

The present invention relates to storage-stable fast-drying multi-component aqueous coating compositions and fast-drying coatings made therefrom.

Used herein, the term "multi-component" refers to aqueous coating compositions having two or more components applied to a substrate in one or more steps.

One of the many important features of coating compositions is the speed at which they dry on the surface of a given substrate after application. For instance, the drying speed of a traffic paint dictates the length of the period of disruption to road traffic during application of that paint to road surfaces, and subsequent drying. The trend is to demand shorter and shorter disruptions of traffic flow, and to meet this demand by using faster drying coating compositions.

Solvent-based fast-drying coating compositions are based on organic polymeric binders dissolved, suspended or otherwise dispersed in relatively low-boiling organic solvents. Low-boiling volatile organic solvents evaporate rapidly after application of the coating composition on the road to provide the desired fast drying characteristics of a freshly applied road marking. However, in addition to releasing volatile organic solvents into the environment, this type of paint formulation tends to expose workers to the vapors of the organic solvents. Because of these shortcomings and increasingly stringent environmental mandates from governments and communities, it is highly desirable to develop more environmentally friendly coating compositions while retaining fast drying properties and/or characteristics.

A more environmentally friendly coating composition uses water based, i.e., aqueous, rather than solvent based, polymers or resins. Coating formulations, both solvent based and aqueous, include binders. The terms "binder" and "binder polymer" used herein refer to polymers that are included in the coating composition and that participate in film formation, becoming part of the resultant film. Binder polymers typically have glass transition temperature (Tg) values in the range −10° C. to 70° C. because those having Tg values below −10° C. tend to have poor resistance to dirt pick-up and those having Tg values above 70° C. usually display diminished ability to form films. In certain applications, however, the lower limit for Tg can be even lower than −10° C. For example, the binder polymers used in roof coatings can have glass transition temperatures as low as −40° C. Primarily due to a combination of high boiling point, high latent heat of vaporization, high polarity, and strong hydrogen bonding of water, drying times of the coatings formed by application of an aqueous coating composition to a substrate surface are generally longer than those exhibited by the organic solvent based coatings. The drying time strongly depends on the relative humidity of the atmosphere in which the coating compositions are applied. An aqueous coating composition may take several hours or more to dry in high humidity. The problem of retarded drying rate is especially aggravated for thick film (greater than about 500μ) coatings. Long drying times severely limit the desirability of using aqueous coating compositions, particularly traffic paints, the drying times of which directly effect the length of traffic disruptions.

U.S. Pat. No. 5,804,627 discloses methods of producing fast drying coatings on the surfaces of substrates. The methods include applying to those surfaces an aqueous coating composition including an anionically stabilized emulsion polymer having a Tg greater than about 0° C., a polyamine functional polymer having from about 20% to about 100% of the monomer units by weight containing an amine group, and an amount of volatile base sufficient to raise the pH of the composition to a point where essentially all of the polyamine functional polymer is in a non-ionic state. During and after application of the aqueous coating composition to the surface of a substrate, the volatile base evaporates with the result that the anionically stabilized polymer particles are destabilized by protonated polyamine functional polymer, thereby accelerating the drying rate of the coating. Although this system affords improvement in drying speeds, more efficient polyamine functional polymers are desired, imparting, for example, equivalent drying speed at reduced levels in coating compositions.

WO 96/22338 discloses a fast drying aqueous coating composition which derives its fast drying characteristic from a mechanism similar to that of U.S. Pat. No. 5,804,627, except that the polyamine functional polymer is poly(ethyleneimine), also referred to herein as PEI. PEI is formed by polymerization of ethylene imine, a highly carcinogenic monomer. The nitrogen content of PEI is higher than that of the other conventional polyamine functional polymers, and this higher nitrogen content offered the promise of higher drying efficiency. Unfortunately, the highly carcinogenic ethylene imine may be present, to some extent, in coating compositions containing PEI, so that such compositions are to be avoided for environmental reasons. Extensive steps must also be taken during manufacture of PEI to prevent exposure of workers to ethylene imine. Moreover, although the promise of PEI in fast drying aqueous coating compositions is that its high level of nitrogen, present as amino groups in the backbone of PEI, will translate into improved drying rates, that promise cannot be fully realized for at least two reasons. First, as the volatile base evaporates from the coating, acidic substances become available to react with the amino groups, yet a significant portion of those backbone amino groups will be less basic and be less accessible to the acidic substances due to the high degree of steric hindrance from adjacent portions of the backbone of the polymer. As a result, the formation of ammonium ions, an essential step in the destabilization of the coating composition, does not occur for all of the amino groups of PEI. Second, and perhaps more importantly, a substantial portion of the ammonium groups that do form from such reaction are not fully accessible for interaction with, and subsequent destabilization of, anionically stabilized emulsion polymers.

We have, surprisingly, found that vinylamine polymers are highly efficient at producing storage stable, fast-drying aqueous coating compositions when those compositions include anionically stabilized binder polymer and volatile base. Unlike the amino groups of PEI, the amino groups of vinylamine polymers are fully available for protonation after evaporation of the volatile amine with the result that vinylamine polymers are more efficient (i.e., give more rapid drying at equal concentrations) than PEI in spite of equal nitrogen content.

One aspect of the present invention relates to a storage stable, fast drying aqueous coating composition, said composition comprising:

(a) an anionically stabilized binder polymer;
(b) a vinylamine polymer having from 20% to 100% by weight of amine functional units, based on total weight of said vinylamine polymer; and
(c) an amount of volatile base sufficient to raise the pH of said composition to a point where essentially all of the amine groups of said vinylamine polymer are in a non-ionic state.

A second aspect of the present invention relates to a coating on the surface of a substrate, said coating comprising:
(a) an anionically stabilized binder polymer; and
(b) a vinylamine polymer having from 20% to 100% by weight of amine functional units, based on total weight of said vinylamine polymer.

A third aspect of the present invention relates to a method of producing a coating on the surface of a substrate, said method comprising the steps of:
(i) applying to said surface a fast drying aqueous coating composition comprising:
(a) an anionically stabilized binder polymer;
(b) a vinylamine polymer having from 20% to 100% by weight of amine functional units, based on total weight of said vinylamine polymer; and
(c) an amount of volatile base sufficient to raise the pH of said composition to a point where essentially all of the amine groups of said vinylamine polymer are in a non-ionic state;
(ii) evaporating said volatile base from said composition; and
(iii) drying said composition to form said coating.

A fourth aspect of the present invention relates to a method of producing a coating on the surface of a substrate, said method comprising the steps of:
(i) applying to said surface an aqueous composition comprising an anionically stabilized binder polymer;
(ii) applying to said surface an aqueous composition comprising a vinylamine polymer having from 20% to 100% by weight of amine functional units, based on total weight of said vinylamine polymer; and
(iii) drying said coating.

The method of the fourth aspect of the present invention may further include, in the aqueous composition comprising a vinylamine polymer, a volatile base in an amount sufficient to deprotonate 20% to 100% of the amine groups of the vinylamine polymer. When the volatile base is present in the aqueous composition comprising a vinylamine polymer, the method further includes the step of evaporating the volatile base from the coating.

Additional aspects of the present invention include the composition of the first aspect and the method of the third aspect wherein the amount of volatile base is sufficient to deprotonate 20% to 100% of the amine groups of said vinylamine polymer.

Used herein, the following terms have these definitions:

"Multi-component" refers to coating compositions having two or more components which may be applied to a substrate in one or more steps, and to the coatings made thereby.

The term "roadway" is used herein as a generic term and it includes any indoor or outdoor solid surface that is or may be exposed to pedestrians, moving vehicles, tractors, or aircraft continuously, continually, or intermittently. Some non-limiting examples of a "roadway" include highways, streets, driveways, sidewalks, runways, taxiing areas, tarmac areas, parking lots, rooftops, and indoor floors (such as factory floors, or floors inside shopping malls). The surface material may be masonry, tar, asphalt, resins, concrete, cement, stone, stucco, tiles, wood, polymeric materials and combinations thereof. Used herein, the term "roadway" also embraces any surface of any substrate associated with a roadway, including, for example, signs, barricades, medial strips, and signal devices.

A "roadway marking" is a coating on the surface of a "roadway".

A "traffic paint" is a coating composition used to form a roadway marking. The traffic paints of the present invention are multi-component aqueous coating compositions.

"Tg" is the "glass transition temperature" of a polymeric phase. The glass transition temperature of a polymer is the temperature at which a polymer transitions from a rigid, glassy state at temperatures below Tg to a fluid or rubbery state at temperatures above Tg. The Tg of a polymer is typically measured by differential scanning calorimetry (DSC) using the mid-point in the heat flow versus temperature transition as the Tg value. A typical heating rate for the DSC measurement is 20° C./minute. The Tg of various homopolymers may be found, for example, in *Polymer Handbook*, edited by J. Brandrup and E. H. Immergut, Interscience Publishers. The Tg of a polymer is calculated by using the Fox equation (T. G. Fox, *Bull. Am. Physics Soc.*, Volume 1, Issue No. 3, page 123 (1956)).

The term "fast-drying" is used herein to mean that a film (i.e., the coating) of a so designated coating composition having a wet coating thickness of 330 microns displays a dry-through time of less than two hours at 90% relative humidity at 23° C. The term "fast-drying aqueous binder composition" refers to an aqueous dispersion of at least one binder polymer that, when applied to a substrate, forms a coating having a dry-through time conforming to the definition of "fast-drying" just given.

The term "amino group" refers to a functional group containing one or more amine nitrogen atoms, wherein an amine nitrogen atom is a nitrogen atom bearing three substituents (e.g., hydrogen, or alkyl, or a portion of a polymer backbone) and a lone pair of electrons. The term "amine group" is used interchangeably with "amino group".

The term "ammonium group" refers to a functional group containing one or more ammonium nitrogen atoms, wherein an ammonium nitrogen atom is a nitrogen atom bearing four substituents (e.g., hydrogen, or alkyl, or a portion of a polymer backbone) and having a positive charge. The ammonium nitrogen atom, along with the substituents attached to it is also referred to as an "ammonium ion"

"Vinylamine polymer" refers to the unsubstituted "poly (vinylamine) homopolymer", and is abbreviated "PVAm". PVAm copolymers are also useful in the present invention, as are N-substituted PVAm homopolymers and copolymers, and N,N-disubstituted PVAm homopolymers and copolymers.

The "backbone" of a polymer chain is a collection of atoms wherein each atom is directly attached to at least two other atoms that form the actual links of the polymer chain. "Terminal" atoms of the backbone are the only exception in that they are connected to only one other atom that forms an actual link of the polymer chain. For example, when ethylene imine is polymerized, its nitrogen and both of its carbons become part of the backbone of the polymer that is produced.

A "linear" polymer is a polymer having a backbone that is not branched.

A "branched" polymer is a polymer having a backbone that has other backbone segments (i.e., "branches") attached to it. For example, the tertiary nitrogens of PEI serve as points of attachment (i.e., "branch points") for other backbone segments.

A "pendant" group is a group that is attached to the backbone of a polymer, yet is not part of that backbone. For example, the poly(vinylamine) backbone contains the two carbons of the vinylamine monomer unit, but the amino group, —NH$_2$, of the vinylamine unit is a pendant group. The amino group is said to be "pendant to" the backbone of the polymer.

"Molecular Weight" may be defined in several ways. Synthetic polymers are almost always a mixture of many different molecular weights, i.e. there is a "molecular weight distribution", abbreviated "MWD". For a homopolymer, members of the distribution differ in the number of monomer units which they contain. This idea also extends to copolymers. Given that there is a distribution of molecular weights, the most complete characterization of the molecular weight of a given sample is the determination of the entire molecular weight distribution. This characterization is obtained by separating the members of the distribution and then quantitating the amount of each that is present. Once this distribution is at hand, there are several summary statistics, or moments, which can be generated from it to characterize the molecular weight of the polymer.

The two most common moments of the distribution are the "weight average molecular weight", "$M_w$", and the "number average molecular weight", "$M_n$". These are defined as follows:

$$M_w = \Sigma(W_i M_i)/\Sigma W_i = \Sigma(N_i M_i^2)/\Sigma N_i M_i$$

$$M_n = \Sigma W_i/\Sigma(W_i/M_i) = \Sigma(N_i M_i)/\Sigma N_i$$

where:
 $M_i$=molar mass of $i^{th}$ component of distribution
 $W_i$=weight of $i^{th}$ component of distribution
 $N_i$=number of chains of $i^{th}$ component and the summations are over all the components in the distribution. $M_w$ and $M_n$ are typically computed from the MWD as measured by Gel Permeation Chromatography (see the Experimental Section).

The present invention requires that the aqueous coating composition include as components a vinylamine polymer and an anionically stabilized emulsion polymer. Additionally, a volatile base is included at a concentration sufficient to deprotonate the conjugate acid of the amino groups of the vinylamine polymer. Typically, 20 to 100 mole % of the amino groups of the vinylamine polymer are deprotonated, preferably 60 to 100 mole %, more preferably 80 to 100 mole %, and most preferably 90 to 100 mole %. The presence of the vinylamine polymer in deprotonated form is necessary if the coating composition is to remain stable during storage, shipping, and handling. The deprotonated amino groups do not bear a charge and, as such, do not interact with the anionic surfactant used to stabilize the emulsion polymer. Once the aqueous coating composition is applied to the surface of a substrate, the volatile base evaporates from the coating. As the volatile base escapes, the amino groups of the vinylamine polymer become protonated to form a conjugate base which is an ammonium cation. The resultant cationic vinylamine polymer then interacts with the anionic surfactant to destabilize the emulsion polymer and, as a result, the coating composition. In that way, accelerated drying is achieved. In the present invention, typically, 5 to 100 mole % of the amino groups of the vinylamine polymer become protonated, forming ammonium groups, as the volatile base evaporates from the aqueous coating composition as it dries on the substrate surface to become a coating. Preferably the percent of amino groups of the vinylamine polymer that become protonated is 10 to 100 mole %, more preferably 40 to 100 mole %, and most preferably 80 to 100 mole %.

The vinylamine polymers of the present invention are unique polyamine functional polymers. Conventional polyamine functional polymers known to the art include, for example, aminoalky vinyl ethers and sulfides; (meth)acrylamides and (meth)acrylic esters, such as dimethylaminoethyl (meth)acrylate, bearing amine functionality; and PEI. Poly(vinylamine) homopolymer, PVAm, itself is higher in nitrogen content than all conventional polyamine functional polymers, with the exception of PEI, which has the same nitrogen content. Although PVAm and PEI have the same number of amino groups, the amino groups of PVAm are primary amine groups and, as such, are less sterically hindered, and more readily accessible than those of PEI, with the result that protonated PVAm is more efficient at destabilizing the anionic emulsion polymer to accelerate drying. Upon application of the coating composition to the surface of a substrate, the volatile amine evaporates, and the amine groups of poly(vinylamine) homopolymer become protonated to form ammonium salts. Due to its higher nitrogen content, the protonated pVAm thus formed has a higher charge density than conventional polyamine functional polymers. This higher charge density translates into higher efficiency when the protonated poly(vinylamine) homopolymer interacts with the centers of negative charge on the anionic surfactants. As a result, destabilization of a given anionically stabilized latex may be achieved with reduced levels of pVAm. Further, this enhanced efficiency is conferred to N-substituted and N,N-disubstituted vinylamine polymers when compared with other polyamine functional polymers having identical substituents on nitrogen, and to vinylamine copolymers (co-pVAms) when compared to other polyamine functional co-polymers having identical levels of co-monomer present as polymerized units.

Only one other polyamine functional polymer offers a nitrogen content as high as that of poly(vinylamine). That polymer is poly(ethylene imine), referred to herein as PEI. PEI is formed by the polymerization of ethylene imine, a highly carcinogenic monomer. Ethylene imine may, therefore, be present, to some extent, in coating compositions containing PEI, so that such compositions are to be avoided for environmental reasons. Moreover, there exist several important structural distinctions between the amino groups of PVAm and those of PEI. When ethylene imine monomer reacts to form PEI, its nitrogen group becomes an integral part of the polymer backbone. In linear portions of the PEI backbone (i.e., portions where branching has not occurred) the repeat unit is —CH$_2$—CH$_2$—NH—, and a segment of the PEI backbone containing, for example, three of these linear repeat units has this structure:

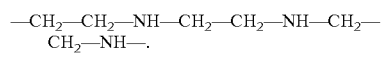
 CH$_2$—NH—.

Because each amine nitrogen of PEI is part of the backbone of the PEI polymer, each amine nitrogen has attached to it either one (i.e., when the amino group occurs at the terminus of the backbone), two (secondary amino groups, i.e., neither a terminus, nor a branch point), or three (tertiary amino groups occurring as branch points) long substituents, each of which is a segment of polymer backbone. This situation is repeated for every nitrogen imbedded in the PEI backbone. For most of the amine nitrogen atoms of the PEI backbone, these substituents may be a few, or tens, or hundreds of atoms long. It is well known in the art of amine chemistry that multiple bulky substituents on the nitrogen of an amine reduce the reactivity of the lone pair of electrons on that nitrogen due to steric hindrance (see D. Barton and W. D. Ollis, *Comprehensive Organic Chemistry*, vol. 2, pp. 34-36, Pergamon Press, New York, 1979). The space immediately surrounding the nitrogen lone electron pair becomes so crowded that the amino group is hindered from interacting with other chemical entities, and in fact the electron density of the lone electron pair decreases as the geometry around the nitrogen becomes flattened due this crowding. For the PEI amine nitrogen atoms, the steric hindrance provided by the two or three extremely large substituents may impede even interaction with small chemical entities, including the proton. It is, therefore, difficult to protonate all, or almost all of the amino groups imbedded in the PEI backbone, so that the high nitrogen content of PEI is not matched by a similarly high charge density (i.e., ammonium groups) once the volatile amine has evaporated from the coating. Furthermore, those amino groups that are protonated to form positively charged ammonium groups have reduced interaction with other chemical entities, again due to very high steric hindrance afforded by the bulky substituent groups.

In order to destabilize the anionically stabilized emulsion polymer of the coating composition, the highly hindered ammonium groups of protonated PEI must make a very close approach to the anionic end of an anionic surfactant molecule which itself is bulky due to the presence of a large hydrophobic tail. The result is that, for many of the ammonium groups that do form along the main chain of protonated PEI, the requisite very close approach is not possible, and those ammonium groups are unable to participate in deactivating the anionic surfactant molecules. As if this situation were not bad enough, PEI is actually not a linear polymer. The ratio of primary amino groups to secondary, to tertiary is 1:2:1, so that approximately 25% of the nitrogen atoms are surrounded by three bulky substituents, making those nitrogen atoms particularly inaccessible as can be seen for the following tertiary nitrogen center:

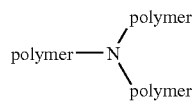

Titration of PEI in water clearly demonstrates this inaccessibility. Even at the very low pH of 2, only 75% of the nitrogens of PEI (i.e., a percentage equal to the percent of primary and secondary nitrogens present) are protonated. This titration data is available in the Polymin™ (Polyethylenimine) product bulletin from BASF.

So, the promise of the high nitrogen content of PEI is not realized as a correspondingly high number of destabilized anionic surfactant molecules. Due to extremely high steric hindrance, only a fraction of the amino groups can be converted to ammonium groups as the volatile base evaporates, and many of those ammonium groups that do form are impeded from contact with anionic surfactant molecules, again due to steric hindrance. Though not wishing to be bound by any particular theory, we believe that, by contrast, pVAm is a linear polymer, having primary amino groups pendant to its backbone. Because they are primary, all of the nitrogen atoms of the amino groups are fully accessible for protonation and the ammonium groups that result are fully accessible for interaction with, and destabilization of anionic surfactants. In short, pVAm is more efficient than PEI, or any other polyamine functional polymer, at destabilization of anionically stabilized polymers. This superior efficiency of destabilization leads directly to faster drying rates for pVAm when compared with other polyfunctional amine polymers at equal weight percent concentration.

The binder polymer of the present invention can be any polymer that can either be prepared as a dispersion in water, or be dispersed in water after preparation. The composition of a binder polymer may be any composition that is characterized by a glass transition temperature falling in ranges specified herein above in the definition of "binder polymer". The specific method by which a binder polymer is prepared is not of particular importance to the present invention. Binder polymers useful in the compositions of the present invention may be prepared via bulk or solution polymerization; or by aqueous dispersion, suspension, or emulsion polymerization; or by any other method that would produce the desired polymer dispersed in water, or capable of being dispersed in water. A preferred method for preparing the binder polymers to be used in coating composition of the present invention is aqueous emulsion polymerization. Polymers thus prepared are usually stabilized by adding anionic, nonionic, cationic, or amphoteric surfactants, or by the incorporation of anionic or cationic moieties into the polymer itself during synthesis. The emulsion polymerization can be carried out by a number processes such as those described in Blackley, D. C. *Emulsion Polymerisation*; Applied Science Publishers: London, 1975; Odian, G. *Principles of Polymerization*; John Wiley & Sons: New York, 1991; *Emulsion Polymerization of Acrylic Monomers*; Rohm and Haas, 1967.

The aqueous emulsion polymer preferred as a binder polymer in the present invention is an addition polymer. The monomers from which the addition polymer is formed are ethylenically-unsaturated. The aqueous emulsion polymer composition may be selected and the polymer prepared by conventional techniques known to those of ordinary skill in the art. The polymer may contain, as polymerized units, one or more ethylenically unsaturated monomers. Examples of these ethylenically unsaturated monomers include: $C_1$-$C_{22}$ linear or branched chain alkyl (meth)acrylates, bornyl (meth)acrylate, isobornyl (meth)acrylate, and the like; hydroxyethyl (meth)acrylate, hydroxypropyl (meth)acrylate; (meth)acrylamide or substituted (meth)acrylamides; styrene or substituted styrenes; butadiene; vinyl acetate or other vinyl ester; butylaminoethyl (meth)acrylate, di(methyl)aminoethyl (meth)acrylate; a monomer containing αβ-unsaturated carbonyl functional groups such as fumarate, maleate, cinnamate and crotonate; and (meth)acrylonitrile. Used herein, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

Halocarbon monomers and siloxane monomers may also be used to prepare the binder polymers of the present invention. Halocarbon monomers are monomers having bromo-, chloro-, or fluoro- sustituents, or combinations thereof. Halocarbon monomers include, for example: 2-bromoethyl (meth)acrylate; 4-bromostyrene; vinylidene chloride, vinyl chloride; pentafluorophenyl (meth)acrylate; 2-(perfluoroalkyl)ethyl (meth)acrylates, including 2-(perfluorododecyl)ethyl (meth)acrylate, and 2-(perfluorohexyl) ethyl (meth)acrylate; tetrafluoroethylene, and vinylidene fluoride.

A acid-functional monomers of the binder polymer of the present invention may also be present as polymerized units at preferably 0-10% by weight, based on the weight of the dry emulsion polymer. Acid-functional monomers useful in the present invention include, for example, (meth)acrylic acid, itaconic acid, crotonic acid, phosphoethyl (meth)acrylate, sulfoethyl (meth)acrylate, 2-acrylamido-2-methyl-1-propanesulfonic acid, fumaric acid, maleic anhydride, monomethyl maleate, and maleic acid.

Optionally, a low level of a multi-ethylenically unsaturated monomer may be incorporated into the polymer to provide crosslinking. The level of multi-ethylenically unsaturated monomer may be 0-5% by weight, based on the weight of the dry emulsion polymer. The upper limit is typically determined by the point at which film formation becomes impaired. Useful multi-ethylenically unsaturated monomers include, for example, allyl (meth)acrylate, diallyl phthalate, 1,4-butylene glycol di(meth)acrylate, 1,6-hexanediol di(meth)acrylate, and trimethylolpropane tri(methyl)acrylate.

Conventional surfactants may be used to stabilize the emulsion polymerization systems before, during, and after polymerization of monomers. These conventional surfactants will usually be present at levels of 0.1 percent to 6 percent by weight based on the weight of total monomer. At least one anionic, nonionic, or amphoteric surfactant may be used, or mixtures thereof. Alternatively, all, or a portion, of the surfactant activity may be provided by initiator fragments, such as those of persulfates, when the fragments become incorporated into the polymer chain. Examples of anionic emulsifiers include sodium lauryl sulfate, sodium dodecyl benzene sulfonate, dioctylsulfosuccinate, sodium polyoxyethylene lauryl ether sulfate, and sodium salt of tert-octylphenoxyethoxypoly(39)ethoxyethyl sulfate. Examples of nonionic surfactants include glycerol aliphatic esters, oleic acid monoglyceride, polyoxyethylene aliphatic esters, polyoxyethylene glycol monostearate, polyoxyethylene cetyl ether, polyoxyethylene glycol monolaurate, polyoxyethylene glycol monooleate, polyoxyethylene glycol stearate, polyoxyethylene higher alcohol ethers, polyoxyethylene lauryl ether, polyoxyethylene nonylphenol ether, polyoxyethylene octylphenol ether, polyoxyethylene oleyl ether, polyoxyethylene stearyl ether, polyoxyethylenesorbitan aliphatic esters, polyoxyethylenesorbitan monolaurate, polyoxyethylenesorbitan monooleate, polyoxyethylenesorbitan monopalmitate, polyoxyethylenesorbitan monostearate, polyoxyethylenesorbitan trioleate, polyoxyethylenesorbitan tristearate, polyoxyethylenesorbitol tetraoleate, stearic acid monoglyceride, tert-octylphenoxyethylpoly(39)ethoxyethanol, and nonylphenoxyethylpoly(40)ethoxyethanol.

Amphoteric surfactants may also be utilized to stabilize particles of the polymer during and after aqueous emulsion polymerization, or other dispersion polymerizations. For the purpose of stabilizing particles of polymer in aqueous systems, amphoteric surfactants may be used at levels of 0.1 percent to 6 percent by weight based on the weight of total monomer. Useful classes of amphoteric surfactant include aminocarboxylic acids, amphoteric imidazoline derivatives, betaines, and macromolecular amphoteric surfactants. Amphoteric surfactants from any of these classes may be further substituted with fluorocarbon substituents, siloxane substituents, or combinations thereof. Useful amphoteric surfactants can be found in Amphoteric Surfactants, ed. B. R. Bluestein and C. L. Hilton, Surfactant Series Vol. 12 Marcel Dekker NY, N.Y.(1982).

Initiation of emulsion polymerization may be carried out by the thermal decomposition of free radical precursors, also called initiators herein, which are capable of generating radicals suitable for initiating addition polymerization. Suitable thermal initiators such as, for example, inorganic hydroperoxides, inorganic peroxides, organic hydroperoxides, and organic peroxides, are useful at levels of from 0.05% to 5.0% by weight, based on the weight of monomers. Free radical initiators known in the art of aqueous emulsion polymerization include water-soluble free radical initiators, such as hydrogen peroxide, tert-butyl peroxide; alkali metal (sodium, potassium or lithium) or ammonium persulfate; or mixtures thereof. Such initiators may also be combined with reducing agents to form a redox system. Useful reducing agents include sulfites such as alkali metal meta bisulfite, or hyposulfite, sodium thiosulfate, or sodium formaldehyde sulfoxylate. The free radical precursor and reducing agent together, referred to as a redox system herein, may be used at a level of from about 0.01% to 5%, based on the weight of monomers used. Examples of redox systems include t-butyl hydroperoxide/sodium formaldehyde sulfoxylate/Fe (III) and ammonium persulfate/sodium bisulfite/sodium hydrosulfite/Fe(III). The polymerization temperature may be 10° C. to 110° C., depending upon such things as free radical initiator decomposition constant and reaction vessel pressure capabilities.

Frequently, a low level of chain transfer agent such as a mercaptan (for example: n-octyl mercaptan, n-dodecyl mercaptan, butyl or methyl mercaptopropionate, mercaptopropionic acid at 0.05% to 6% by weight based on total weight of monomer) is employed to limit the formation of any significant gel fraction or to control molecular weight.

Used herein, the term "vinylamine polymer" refers to poly(vinylamine) homopolymer, vinylamine copolymers, N-substituted poly(vinylamine) homopolymers, N,N-disubstituted poly(vinylamine) homopolymers, N-substituted vinylamine copolymers, N,N-disubstituted vinylamine copolymers, and combinations thereof. Unsubstituted poly(vinylamine) homopolymer is abbreviated "pVAm", and is interchangeably referred to herein as "poly(vinylamine)" or "poly(vinylamine) homopolymer". Vinylamine copolymers may contain one or more types of vinylamine monomer as polymerized units. Alternatively or additionally, vinylamine copolymers may include, as polymerized units, monomers that are not vinylamine monomers. PVAm is available as Lupasol™ LU 321 from BASF Corporation, Rensselaer, N.Y. The N-substituents of N-substituted pVAms and N-substituted vinylamine copolymers, include linear, branched, or cyclic alkyl groups having 1 to 6 carbons, and β-hydroxyalkyl groups having 1 to 6 carbons. The vinylamine copolymers must contain vinylamine monomer, N-substituted vinylamine monomer, N,N-substituted vinylamine monomer, or combinations thereof, present as polymerized units, in an amount of, preferably 20 to 100 mole percent, more preferably 50 to 100 mole %, and most preferably 80 to 100 mole % of the vinylamine copolymer. All ranges specified herein are inclusive and combinable. The N-substituents of N,N-disubstituted pVAms and N,N-disubstituted vinylamine copolymers include linear, branched, or cyclic alkyl groups having 1 to 6 carbons, β-hydroxyalkyl groups having 1 to 6 carbons, and combinations thereof. Preferred vinylamine polymers are poly(vinylamine) homopolymer, poly(N-methylvinylamine), poly(N-ethylvinylamine), and poly(N-propylvinylamine). Most preferred is poly(vinylamine) homopolymer. The monomers that are not vinylamine monomers, or precursors to vinylamine functionality such as N-vinylformamide, that are useful in the preparation of vinylamine copolymers may be any of the monomers listed herein above as useful in the preparation of the binder polymer.

The vinylamine polymers of the present invention may be, in either their fully protonated, partially protonated or fully deprotonated forms, insoluble in water. Alternatively, they may be soluble or partially soluble in water when present at any degree of protonation. In the method of the present invention, the vinylamine polymer may be applied to the surface of a substrate as part of the aqueous coating composition which includes an anionically stabilized binder polymer and a volatile base. Alternatively, the vinylamine polymer may be applied as a component of an aqueous composition that is separate from the aqueous composition containing the anionically stabilized binder polymer. In the latter alternative, a volatile base may, optionally, be present in the aqueous composition containing the vinylamine polymer. Vinylamine polymers may be prepared in a variety of ways, a few examples of which are found in the following references. U.S. Pat. No. 5,492,765 discloses preparation of vinylamine copolymers, for example, copolymers containing, as polymerized units, ethylene, vinyl alcohol and vinylamine derived from monomers including vinyl acetate, ethylene, N-vinylformamide, and N-vinylacetamide. The amino groups of these co-pVAms may be in ammonium ion form due to reaction with mineral acid, or in non-ionic form, or in partially neutralized form, depending upon pH. Weight average molecular weights (Mw) are in the range 10,000-500,000. Re. 30,362, a reissue of U.S. Pat. No. 4,018,826, discloses the preparation of pVAm salts of mineral acids from vinylacetamide. U.S. Pat. No. 4,774,285 discloses N-vinylformamide (95-10 mole %) copolymerized with 5-90 mole % of ethylenically unsaturated monomers including: vinyl acetate, vinyl propionate; C1-C4 alkyl vinyl ethers; esters, nitriles, and amides of (meth)acrylic acid; (meth)acrylic acid; and N-vinylpyrrolidone. U.S. Pat. No. 6,114,435 discloses preparation of polymers containing N-vinylcarboxamide units. The N-vinylcarboxamide monomer includes N-vinylformamide, N-vinylmethylformamide, N-vinylacetamide, N-vinyl-N-methylacetamide, N-vinyl-N-ethylacetamide, N-vinylpropionamide, N-vinyl-N-methylpropionamide and N-vinylbutyramide. Following polymerization, hydrolysis leads to vinylamine polymers. U.S. Pat. No. 6,057,404 discloses preparation of β-hydroxyalkylvinylamine polymers. U.S. Pat. No. 5,863,879 discloses preparation of N-substituted vinylamine polymers wherein the substituent is C1-C6 alkyl. U.S. Pat. No. 5,280,077 discloses synthesis of oligomeric vinylamines having molecular weights in the range 600 to 2,500. The weight average molecular weight, $M_w$, of the vinylamine polymer of the present invention may be 500 to 5,000,000, preferably 2,000 to 500,000, more preferably 5,000 to 250,000, and most preferably 10,000 to 75,000.

The amount of vinylamine polymer useful in the present invention is typically 0.25 to 40 weight percent, preferably 0.5 to 30 weight %, more preferably 1 to 20 weight %, and most preferably 2 to 10 weight %, based on the weight of the binder polymer.

The type and amount of volatile base used must be sufficient to raise the pH of the composition to about the point where the polyfunctional amine is non-ionized (deprotonated), to avoid interaction with the anionically stabilized emulsion. The volatile base of preference is ammonia, which may be used as the sole volatile base or in admixture with other volatile or nonvolatile bases. Volatile bases useful in the present invention include, for example, ammonia, morpholine, the lower alkyl amines, 2-dimethylaminoethanol, N-methylmorpholine, ethylenediamine, and others.

It is generally desirable to have additional components added to the coating composition to form the final formulation for coating compositions, including traffic paints, described herein. These additional components include, for example, thickeners; rheology modifiers; dyes; sequestering agents; biocides; dispersants; pigments, such as, titanium dioxide, organic pigments, carbon black; extenders, such as calcium carbonate, talc, clays, silicas and silicates; fillers, such as glass or polymeric microspheres, quartz and sand; anti-freeze agents; plasticizers; adhesion promoters such as silanes; coalescents; wetting agents; surfactants; slip additives; crosslinking agents; defoamers; colorants; tackifiers; waxes; preservatives; freeze/thaw protectors; corrosion inhibitors; and anti-flocculants. During application of the aqueous coating composition of the present invention to the surface of a substrate, glass or polymeric microspheres, quartz and sand may be added as part of the that coating composition or as a separate component applied to the surface in a separate step simultaneously with, before, or after the step of application of the aqueous coating composition.

During application of the aqueous coating composition of the present invention to the surface of a substrate, "absorbers" may be added as a separate component applied to the surface in a separate step simultaneously with, before, or after the step of application of the aqueous coating composition. Used herein, the term "absorber" refers to the general class of materials that includes hollow sphere polymer, ion exchange resin beads (e.g., in acid form, in base form, in salt form, in partially neutralized form, or in mixed salt form), and absorbent inorganic compounds (e.g., inorganic superabsorbent gel, Sumica gel), including talc. Other "absorbers" useful in the present invention are molecular sieves, non-porous carbonaceous materials, porous carbonaceous materials, and superabsorbent polymers (abbreviated SAP or SAPs herein). These absorber are capable of further increasing the drying rate of the aqueous coating compositions of the present invention.

The aqueous coating compositions of the present invention include, for example, interior house paints, exterior house paints, automotive paints, appliance paints, and traffic paints. The preferred use of the aqueous coating composition of the present invention is as a traffic paint which can be applied to a roadway surface to form a roadway marking.

EXPERIMENTAL

Lupasol™ LU 321 is a high molecular weight poly (vinylamine) available from BASF Corporation of Rensselaer, N.Y.

Molecular Weight Determination using Gel Permeation Chromatography (GPC)

Gel Permeation Chromatography, otherwise known as size exclusion chromatography, actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in *Modern Size Exclusion Chromatography*, W. W. Yau, J. J Kirkland, D. D. Bly; Wiley-Interscience, 1979, and in *A Guide to Materials Characterization and Chemical Analysis*, J. P. Sibilia; VCH, 1988, p. 81-84.

For example, the molecular weight information for a low molecular weight sample (e.g., 10,000) may be determined as follows: The sample (an aqueous emulsion containing low molecular weight particles) is dissolved in THF at a concentration of approximately 0.1% weight sample per volume THF, and shaken for 6 hours, followed by filtration through a 0.45 μm PTFE (polytetrafluoroethylene) membrane filter. The analysis is performed by injecting 100 μl of the above solution onto 3 columns, connected in sequence and held at 40° C. The three columns are: one each of PL Gel 5 100, PL Gel 5 1,000, and PL Gel 5 10,000, all available from Polymer Labs, Amherst, Mass. The mobile phase used is THF flowing at 1 ml/min. Detection is via differential refractive index. The system is calibrated with narrow polystyrene standards. PMMA-equivalent molecular weights for the sample are calculated via Mark-Houwink correction using $K=14.1 \times 10^{-3}$ ml/g and $a=0.70$ for the polystyrene standards and $K=10.4 \times 10^{-3}$ ml/g and $a=0.697$ for the sample.

Dry Through Tests

Each test paint is applied to a 4" (10.2 cm)×12" (30.5 cm) glass panel using a drawdown blade having a gap of 500μ, (20 mils).

After application of the coating, the panels are immediately placed in a high humidity test chamber supplied by Victor Associates, Inc. (Hatboro, Pa.), maintained at a relative humidity of 90%±3%. This test chamber is equipped with a certified hygrometer and temperature indicator, both of which are fastened to the center of the rear wall of the test chamber to ensure balanced measurement. The 90%±3% relative humidity is obtained by filling the pan at the bottom of the completely closed test chamber with a 1 inch layer of water, equilibrating the chamber overnight (about 16 hours) before testing (bringing the relative humidity inside the chamber to 100%), and then adjusting the size of the side port openings to achieve a relative humidity of 90%±3% within the chamber. The temperature inside the test chamber is 23° C. (74° F.).

The door of the test chamber is opened briefly at 5-minute intervals to evaluate the dry-through time for the paint test panel. Dry-through time is defined as the time it takes for a wet paint film to reach a state such that the paint cannot be distorted with a 90° thumb twist when the thumb is touching the paint surface, but no pressure is being applied. During the early stages of drying, dry through is assessed by pushing a small applicator stick through the surface of the film to the substrate, and then gauging the dryness of the coating in the lower layer by dragging the applicator stick along the substrate for a length of approximately 0.5 inch (~1.27 cm). As it becomes clear that the coating is approaching a dried through state, the panel is then removed from the box at the appropriate time, and the aforementioned 90° thumb twist test is conducted.

EXAMPLE 1

Preparation of an Aqueous Coating Composition Containing a Binder Polymer, a Vinylamine Polymer and a Volatile Base To a 5-liter reactor containing 1224.6 g deionized water (DI water) under a nitrogen atmosphere at 81° C., 4.7 g of sodium dodecylbenzene sulfonate (23% active), 67.7 g of monomer emulsion, disclosed in table I below, 3.2 g of sodium carbonate dissolved in 60 g DI water and 3.2 g ammonium persulfate dissolved in 50 g DI water are added with stirring. The remainder of the monomer emulsion No. 1 and a solution of 3.2 g ammonium persulfate dissolved in 100 g DI water are gradually added over a period of 162 minutes. At the end of the feed, 50 g of DI water is added to rinse the monomer emulsion feed line. After cooling to 60° C., 9.0 g of an aqueous solution of ferrous sulfate heptahydrate (0.15%), 1.6 g t-butylhydroperoxide dissolve in 20 g DI water and 0.8 g of sodium sulfoxylate formaldehyde didhydrate dissolved in 20 g DI water are added. Ammonium hydroxide (28%) is added to raise the pH to approximately 10.7 after which is added 180 g of poly (vinylamine) solution (12% by weight, based on the total weight of aqueous solution). The weight average molecular weight, Mw, of the binder polymer should be 250,000 as determined by gel permeation chromatography.

TABLE I

Composition of Monomer Emulsion No. 1

| Ingredient Emulsion No | Weight in grams |
| --- | --- |
| DI water | 541.1 |
| sodium dodecylbenzenesulfonate (23 percent by weight in water) | 19.7 |
| butyl acrylate | 1080.0 |
| methyl methacrylate | 1051.9 |
| methacrylic acid | 28.1 |

COMPARATIVE EXAMPLE A

Preparation of an Aqueous Coating Composition Containing a Binder Polymer, a Volatile Base, but no Vinylamine Polymer To a 5-liter reactor containing 1224.6 g deionized water (DI water) under a nitrogen atmosphere at 81° C., 4.7 g of sodium dodecylbenzene sulfonate (23% active), 67.7 g of monomer emulsion, disclosed in Table I above, 3.2 g of sodium carbonate dissolved in 60 g DI water and 3.2 g ammonium persulfate dissolved in 50 g DI water are added with stirring. The remainder of the monomer emulsion No. 1 and a solution of 3.2 g ammonium persulfate dissolved in 100 g DI water are gradually added over a period of 162 minutes. At the end of the feed, 50 g of DI water is added to rinse the monomer emulsion feed line. After cooling to 60° C., 9.0 g of an aqueous solution of ferrous sulfate heptahydrate (0.15%), 1.6 g t-butylhydroperoxide dissolve in 20 g DI water and 0.8 g of sodium sulfoxylate formaldehyde didhydrate dissolved in 20 g DI water are added. Ammonium hydroxide (10.5 g of a 28% aqueous solution) is added. The weight average molecular weight, Mw, of the binder polymer should be 250,000 as determined by gel permeation chromatography.

EXAMPLE 2

Preparation of an Aqueous Coating Composition Containing a Binder Polymer, a Vinylamine Polymer and a Volatile Base To a 5-liter reactor containing 1257.0 g deionized water (DI water) under a nitrogen atmosphere at 81° C., 4.7 g of sodium dodecylbenzene sulfonate (23% active), 67.7 g of monomer emulsion, disclosed in Table II below, 3.2 g of sodium carbonate dissolved in 60 g DI water and 3.2 g ammonium persulfate dissolved in 50 g DI water are added with stirring. The remainder of the monomer emulsion No. 2 and a solution of 3.2 g ammonium persulfate dissolved in 100 g DI water are gradually added over a period of 162 minutes. At the end of the feed, 50 g of DI water is added to rinse the monomer emulsion feed line. After cooling to 60° C., 9.0 g of an aqueous solution of ferrous sulfate heptahydrate (0.15%), 1.6 g t-butylhydroperoxide dissolve in 20 g DI water and 0.8 g of sodium sulfoxylate formaldehyde dihydrate dissolved in 20 g DI water are added. Ammonium hydroxide (28%) is added to raise the pH to approximately 10.8 after which is added 135 g of polyvinylamine solution (12%). The weight average molecular weight, Mw, of the binder polymer should be 40,000 as determined by gel permeation chromatography.

TABLE II

Composition of Monomer Emulsion No. 2

| Ingredient Emulsion No | Weight in grams |
|---|---|
| DI water | 541.1 |
| sodium dodecylbenzenesulfonate (23 percent by weight in water) | 19.7 |
| butyl acrylate | 1080.0 |
| methyl methacrylate | 1051.9 |
| methacrylic acid | 28.1 |
| n-dodecyl mercaptan | 32.4 |

COMPARATIVE EXAMPLE B

Preparation of an Aqueous Coating Composition Containing a Binder Polymer, a Volatile Base, but no Vinylamine Polymer To a 5-liter reactor containing 1257.0 g deionized water (DI water) under a nitrogen atmosphere at 81° C., 4.7 g of sodium dodecylbenzene sulfonate (23% active), 67.7 g of monomer emulsion, disclosed in Table II above, 3.2 g of sodium carbonate dissolved in 60 g DI water and 3.2 g ammonium persulfate dissolved in 50 g DI water are added with stirring. The remainder of the monomer emulsion No. 2 and a solution of 3.2 g ammonium persulfate dissolved in 100 g DI water are gradually added over a period of 162 minutes. At the end of the feed, 50 g of DI water is added to rinse the monomer emulsion feed line. After cooling to 60° C., 9.0 g of an aqueous solution of ferrous sulfate heptahydrate (0.15%), 1.6 g t-butylhydroperoxide dissolve in 20 g DI water and 0.8 g of sodium sulfoxylate formaldehyde dihydrate dissolved in 20 g DI water are added. Ammonium hydroxide (10.5 g of a 28% aqueous solution) is added. The weight average molecular weight, Mw, of the binder polymer should be 40,000 as determined by gel permeation chromatography.

EXAMPLES 3 and 4, and COMPARATIVE EXAMPLES C and D

Preparation of Paints from Aqueous Coating Composition

To examples 1 and 2, and comparative examples A and B, the following components are added in the order shown in Table III to prepare the pre-mixes for examples 3 and 4, and comparative examples C and D:

TABLE III

Ingredients used to prepare pre-mixes for Examples 3 and 4 and Comparative Examples C and D.

| Ingredient | Example 3 pre-mix | Example 4 pre-mix | Comp. Example C pre-mix | Comp. Example D pre-mix |
|---|---|---|---|---|
| Example 1 | 433.3 | | | |
| Example 2 | | 433.3 | | |
| Comparative Example A | | | 433.3 | |
| Comparative Example B | | | | 433.3 |
| DI water | 20.7 | 20.7 | 20.7 | 20.7 |
| Dispersant[1] | 5.4 | 5.4 | 5.4 | 5.4 |
| Surfactant[2] | 2.9 | 2.9 | 2.9 | 2.9 |
| Defoamer[3] | 2.1 | 2.1 | 2.1 | 2.1 |
| White pigment[4] | 103.4 | 103.4 | 103.4 | 103.4 |
| Extender[5] | 786.5 | 786.5 | 786.5 | 786.5 |

Unless stated otherwise, the following commercial components were used:
[1]Tamol 901 Dispersant, an ammonium salt of polyelectrolyte supplied by Rohm and Haas company, Philadelphia, PA @ 30% by weight
[2]Surfynol CT-136 Surfactant, an acetylenic surfactant supplied by Air Products and chemicals, Inc., Allentown, PA
[3]Drew L-493 Defoamer supplied by Drew Chemical Company, Boonton, NJ
[4]Ti Pure R-900 Titanium dioxide supplied by E.I.duPont de Nemours & Company, Wilmington, DE
[5]Omyacarb 5, Ground natural calcium carbonate, evaluated under ASTM D 1199, Type GC, Grade 11 having a number average particle size of 5.5 microns with maximum oil adsorption No. of 10, supplied by Omya, Inc., Proctor, VT The components of Table III are mixed for 10 minutes or until smooth (the fineness of the grind as tested according to ASTM D1210 of not less than 3 Hegmen units) to form a mix to which the following components are added, in the order shown in Table IV, with continuous mixing:

TABLE IV

Ingredients used to prepare Examples 3 and 4 and Comparative Examples C and D.

| Ingredient | Example 3 | Example 4 | Comp. Example C | Comp. Example D |
|---|---|---|---|---|
| Example 3 pre-mix | 1354.3 | | | |
| Example 4 pre-mix | | 1354.3 | | |
| Comparative Example C pre-mix | | | 1354.3 | |
| Comparative Example D pre-mix | | | | 1354.3 |
| methanol | 25.8 | 25.8 | 25.8 | 25.8 |
| coalescing solvent[6] | 19.2 | 19.2 | 19.2 | 19.2 |
| defoamer[3] | 3.6 | 3.6 | 3.6 | 3.6 | unless otherwise noted the following commercial components were used:
[6]Texanol Ester alcohol supplied by Eastman Chemicals, Kingsport, TN
[3]Drew L-493 Defoamer supplied by Drew Chemical Company, Boonton, NJ

TABLE V

| Empl. No. | vinylamine polymer | Paint Formulation (from Table IV) | Dry-through Time[a] (min.) | Drawdown gap |
|---|---|---|---|---|
| 5 | none | Comparative Example C | >180 | 20 mils |
| 6 | none | Comparative Example D | >180 | 20 mils |

TABLE V-continued

| Empl. No. | vinylamine polymer | Paint Formulation (from Table IV) | Dry-through Time[a] (min.) | Drawdown gap |
|---|---|---|---|---|
| 7 | poly(vinylamine) | Example 3 | 45 | 20 mils |
| 8 | poly(vinylamine) | Example 4 | 45 | 20 mils |

[a]Dry-through time was measured at 23° C. and 90% relative humidity.

I claim:

1. A method of producing a coating on the surface of a substrate, said method comprising the steps of:
   (i) applying to said surface an aqueous composition comprising an anionically stabilized binder polymer;
   (ii) applying to said surface an aqueous composition comprising a vinylamine polymer having from 20% to 100% by weight of amine functional units, based on total weight of said vinylamine polymer; and
   (iii) drying said coating.

2. The method of claim 1,
   wherein said aqueous composition comprising a vinylamine polymer further comprises an amount of volatile base sufficient to deprotonate 60% to 100% of the amine groups of said vinylamine polymer; and
   wherein said method further comprises the step of evaporating said volatile base from said coating.

3. The method as claimed in claim 2, wherein the said amount of volatile base is sufficient to deprotonate essentially all of the amine groups of the said vinylarnine polymer.

* * * * *